(12) United States Patent  
Tilli et al.

(10) Patent No.: US 6,205,612 B1  
(45) Date of Patent: Mar. 27, 2001

(54) WINDOW WIPER SYSTEM FOR AN AUTOMOTIVE VEHICLE

(75) Inventors: Christopher R. Tilli, Westland; Daniel D. Kilker, Canton; Steven Reau, Farmington Hills, all of MI (US); Robin Mihekun Miller, Ellington, CT (US)

(73) Assignee: UT Automotive Dearborn, Inc., Dearborn, MI (US)

( * ) Notice: Subject to any disclaimer, the term of this patent is extended or adjusted under 35 U.S.C. 154(b) by 0 days.

(21) Appl. No.: 08/948,167

(22) Filed: Oct. 9, 1997

(51) Int. Cl.[7] ................. B60S 1/18; B60S 1/22; B60S 1/06
(52) U.S. Cl. ............. 15/250.16; 15/250.3; 15/250.31; 74/89.14; 74/426
(58) Field of Search ............. 15/250.3, 250.31, 15/250.16, 250.17; 74/89.14, 89.15, 84, 85

(56) References Cited

U.S. PATENT DOCUMENTS

| 2,102,268 | * | 12/1937 | Hoppenstand . |
| 2,271,207 | | 1/1942 | Rhein . |
| 2,345,778 | | 4/1944 | Lammeren et al. . |

(List continued on next page.)

FOREIGN PATENT DOCUMENTS

| 822 178 | 11/1951 | (DE) . |
| 28 16 207 A1 | 10/1979 | (DE) . |
| 3807087 A1 | 9/1989 | (DE) . |
| 39 23 688 A1 | 1/1991 | (DE) . |
| 43 13 363 A1 | 11/1993 | (DE) . |
| 43 37 760 A1 | 5/1994 | (DE) . |
| 0 345 002 A2 | 6/1989 | (EP) . |
| 1281424 | 12/1961 | (FR) . |
| 2432409 | * 1/1978 | (FR) . |
| 2 153 218 | 8/1985 | (GB) . |
| 56-22150 | 2/1981 | (JP) . |
| 5-86761 | 4/1993 | (JP) . |
| WO 96/33891 | 10/1996 | (WO) . |
| WO 96/33892 | 10/1996 | (WO) . |
| WO 96/33893 | 10/1996 | (WO) . |

OTHER PUBLICATIONS

Patent Abstracts of Japan, vol. 016, 7–438 (M–1309), Sep. 11, 1992 for JP Patent Publication No. 04151351.

p. 100, *Machine Design*, 60 (1988) Oct. 13, No. 24, Cleveland, Ohio, US.

Machine Design, "Mechanisms for Intermittent Motion, "Part 4", Mar. 1952, Otto Lichtwitz, pp. 147–155.

(List continued on next page.)

*Primary Examiner*—Gary K. Graham
*Assistant Examiner*—Jennifer McNeil
(74) *Attorney, Agent, or Firm*—Harness, Dickey & Pierce, P.L.C.

(57) ABSTRACT

A window wiper system for an automotive vehicle has an electromagnetic device, a rotatable member and a window wiper oscillating mechanism. In another aspect of the present invention, the electromagnetic device is an electric motor which operates in a unidirectional manner to oscillate a window wiper assembly back and forth in a normal window wiping range. The electric motor and rotatable member then reverse rotational direction to move the wiper assembly to a park position offset from the normal window wiping range.

19 Claims, 5 Drawing Sheets

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry ................................ 15/250.02 |
| 3,619,676 | 11/1971 | Kawakami . |
| 3,659,128 | 4/1972 | Danek .................................... 310/99 |
| 3,665,722 | 5/1972 | Beard et al. ............................ 74/75 |
| 3,688,332 | 9/1972 | Bellware ........................... 15/250.16 |
| 3,689,817 | 9/1972 | Elliott .................................. 318/443 |
| 3,694,723 | 9/1972 | Schneider et al. . |
| 3,705,520 | 12/1972 | Carpenter . |
| 3,803,627 | 4/1974 | Schuscheng ........................ 343/903 |
| 3,858,922 | 1/1975 | Yamanaka . |
| 3,917,330 | 11/1975 | Quantz ................................ 292/216 |
| 3,927,436 | 12/1975 | Inoue et al. ........................ 15/250.17 |
| 4,009,952 | 3/1977 | Badalich et al. ..................... 353/109 |
| 4,065,234 | 12/1977 | Yoshiyuki et al. .................. 417/420 |
| 4,158,159 | 6/1979 | Orris et al. .......................... 318/443 |
| 4,173,055 | 11/1979 | Izumi et al. ....................... 15/250.02 |
| 4,183,114 | 1/1980 | Eden ................................. 15/250.25 |
| 4,259,624 | 3/1981 | Seibicke .............................. 318/282 |
| 4,271,381 | 6/1981 | Munz et al. .......................... 318/282 |
| 4,309,646 | 1/1982 | Liedtke et al. ....................... 318/443 |
| 4,336,482 | 6/1982 | Goertler et al. ..................... 318/443 |
| 4,352,299 | 10/1982 | Riggs et al. ............................. 74/84 |
| 4,422,522 | 12/1983 | Slavin et al. ......................... 180/281 |
| 4,434,678 | 3/1984 | Maus ................................. 74/471 R |
| 4,450,390 | 5/1984 | Andrei-Alexandru et al. ...... 318/282 |
| 4,478,004 | 10/1984 | Andrei-Alexandru et al. ......... 49/72 |
| 4,492,904 | 1/1985 | Graham ............................... 318/444 |
| 4,507,711 | 3/1985 | Ono et al. ............................. 362/61 |
| 4,518,181 * | 5/1985 | Yamada ................................ 292/201 |
| 4,553,656 | 11/1985 | Lense ............................... 192/142 R |
| 4,573,723 | 3/1986 | Morita et al. ..................... 292/336.3 |
| 4,630,178 | 12/1986 | Mugford et al. ...................... 362/64 |
| 4,639,065 | 1/1987 | Kohler et al. .................... 339/119 R |
| 4,660,698 | 4/1987 | Miura ..................................... 192/45 |
| 4,674,781 | 6/1987 | Reece et al. ..................... 292/336.3 |
| 4,701,972 | 10/1987 | Saito . |
| 4,702,117 | 10/1987 | Tsutsumi et al. ................... 74/89.17 |
| 4,724,760 | 2/1988 | Bubley . |
| 4,733,147 | 3/1988 | Muller et al. ......................... 318/443 |
| 4,791,698 * | 12/1988 | Murata ............................. 15/250.13 |
| 4,793,640 | 12/1988 | Stewart, Sr. . |
| 4,875,053 | 10/1989 | Harada ................................. 343/903 |
| 4,878,398 | 11/1989 | Heinrich ................................ 74/959 |
| 4,885,512 | 12/1989 | Gille et al. ........................... 318/444 |
| 4,893,039 | 1/1990 | Isii ......................................... 310/89 |
| 4,918,272 | 4/1990 | Nishikawa ........................... 200/501 |
| 5,007,131 | 4/1991 | Chevalier et al. ................. 15/250.19 |
| 5,023,530 | 6/1991 | Ohashi et al. ........................ 318/446 |
| 5,045,741 | 9/1991 | Dvorsky ............................... 310/209 |
| 5,063,317 | 11/1991 | Bruhn .................................... 310/91 |
| 5,119,523 | 6/1992 | Unterborn ......................... 15/250.16 |
| 5,182,957 | 2/1993 | Bohmer et al. ......................... 74/42 |
| 5,214,440 | 5/1993 | Takahashi et al. ................... 343/903 |
| 5,218,255 | 6/1993 | Horiguchi ............................... 310/71 |
| 5,222,775 | 6/1993 | Kato ..................................... 292/201 |
| 5,226,200 | 7/1993 | Buchanan, Jr. et al. .......... 15/250.13 |
| 5,228,239 | 7/1993 | Heo ........................................ 49/280 |
| 5,251,114 | 10/1993 | Cantin et al. ........................ 362/286 |
| 5,274,875 | 1/1994 | Chou ................................ 15/250.19 |
| 5,291,109 | 3/1994 | Peter ................................... 318/443 |
| 5,315,735 | 5/1994 | I-Shin ............................... 15/250.22 |
| 5,333,351 | 8/1994 | Sato ................................. 15/250.13 |
| 5,355,061 | 10/1994 | Forhan ................................ 318/443 |
| 5,355,286 | 10/1994 | Flint ...................................... 362/65 |
| 5,373,605 | 12/1994 | Austin .............................. 15/250.24 |
| 5,427,345 | 6/1995 | Yamakami et al. .................. 248/394 |
| 5,440,186 | 8/1995 | Forsell et al. ........................ 310/239 |
| 5,462,337 | 10/1995 | Yamakami ...................... 297/344.13 |
| 5,465,636 * | 11/1995 | Jones et al. ............................ 74/602 |
| 5,485,044 | 1/1996 | Mackay et al. ........................ 310/90 |
| 5,519,258 | 5/1996 | Stroven et al. ..................... 307/10.1 |
| 5,528,959 | 6/1996 | Yamakami ..................... 74/665 GD |
| 5,691,586 | 11/1997 | Yonnet et al. ..................... 310/75 D |
| 5,694,812 | 12/1997 | Maue et al. ........................ 74/471 R |
| 5,730,028 | 3/1998 | Maue et al. ........................ 74/480 R |
| 5,844,382 | 12/1998 | Dan . |

OTHER PUBLICATIONS

A paper from the Third Confernece on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Mechinery", Hamilton H. mabie and Fred W. Ocvirk, John Wiley & Sons, 1957.

A paper form the International Congress & Exposition, SAE Technical Paper Series 960390, "Liftgate Multiplexed Node", Feb., 1996, H. Winston Maue, pp. 73–76.

Exhibit A—(UTA 26 Gate Wiper Motor), prior to Oct. 9, 1997.

Exhibit B—(1996 Ford Windstar Wiper Motor), prior to Oct. 9, 1997.

Exhibit C—(1996 Chevy Blazer Wiper Motor), prior to Oct. 9, 1997.

Exhibit D—(1996 Honda Civic Rear Unidirectional Wiper Motor), prior to Oct. 9, 1997.

Exhibit E—(1996 Toyota Direct Drive Unidirectional Wiper Motor), prior to Oct. 9, 1997.

Exhibit F—(1996 Honda Civic Wiper Motor), prior Oct. 9, 1997.

Exhibit G—(Wiper Motor), Prior to Oct. 9, 1997.

Exhibit H—(Wiper Motor), prior to Oct. 9, 1997.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Mahine Design, "Mechanisms for Intermittent Motion, "Part 2", Jan. 1952, Otto Lichtwitz, pp. 127–141.

Machine Design, "mechanisms for Intermittent Motion, "Part 3", Feb. 1952, Otto Lichtwitz, pp. 146–155.

* cited by examiner

WINDOW WIPER SYSTEM FOR AN AUTOMOTIVE VEHICLE

BACKGROUND OF THE INVENTION

This invention relates generally to window wipers and more specifically to a window wiper system for an automotive vehicle.

It is common in the automotive industry to employ windshield and rear window wiper systems that have an electric motor and a worm gear which are constantly reversing direction in order to oscillate a wiper arm and wiper blade back and forth within a wiping range or path on the window. In other words, the electric motor and worm gear rotate in first respective directions for moving the wiper arm and blade to one side of the window and then reverse directions for moving the wiper arm and blade to the other side of the window. In some situations, the electric motor and worm gear are further rotated to move the wiper arm and blade off of the window to a park position.

These constantly reversing electric motors often suffer from objectionable noise and are prone to a shortened duration due to the longitudinal impact of the ends of the armature shaft against the adjacent bearing and end plug members retaining the armature shaft. These conventional devices also cause a high stress enmeshed condition between the worm gear portion of the armature shaft and the driven worm gear teeth thereby causing gear tooth breakage.

It is also known to provide a four-bar linkage to couple a worm gear to a window wiper shaft. In this arrangement, an electric motor and worm gear rotate in a unidirectional manner to facilitate back and forth oscillation of a window wiper arm and blade. In this unidirectional, four-bar linkage construction, a pin always moves concurrently with the worm gear, since the pin is always fixed to the worm gear in a single location. The pin is also coupled to the four-bar linkage. This serves to reduce noise and encourage prolonged life of the electric motor and gears, but has proven difficult to provide a wiper arm and wiper blade park position off of the window. Moreover, the four-bar linkage cannot remain stationary if the worm gear is rotated. Such an arrangement is disclosed in U.S. Pat. No. 5,182,957 entitled "Drive Unit, in Particular for a Windshield Wiper System on a Motor Vehicle" which issued to Bohmer et al. on Feb. 2, 1993.

It is also known to provide a window wiper construction having an electric motor and a worm gear with a continuous and closed loop cam track. A pin connected to a drive pawl rides in the cam track. In one position, the pin of the drive pawl is cammed from engagement with a shoulder of the cam track so as to interrupt the driving connection between an output shaft coupled to the wiper and the worm gear. Such an arrangement is disclosed in U.S. Pat. No. 3,688,332 entitled "Mechanism for Opening and Closing a Cover for a Concealed Wiper System" which issued to Bellware on Sep. 5, 1972. Notwithstanding, this device appears to be overly complex. It also requires a large number of parts which adds undue expense. Moreover, disengagement of the drive pawl from the cam track can cause reengagement difficulties due to tolerance mismatches of parts or due to operation of the device on a bumpy road.

SUMMARY OF THE INVENTION

In accordance with the present invention, a window wiper system for an automotive vehicle has an electromagnetic device, a rotatable member and a window wiper oscillating mechanism. In another aspect of the present invention, the electromagnetic device is an electric motor which operates in a unidirectional manner to oscillate a window wiper assembly back and forth in a normal window wiping range. The electric motor and rotatable member then reverse rotational direction to move the wiper assembly to a park position offset from the normal window wiping range. In a further aspect of the present invention a spiral curved track is provided in the rotatable member for receiving a coupling coupled to the window wiper oscillating mechanism. In still another aspect of the present invention, the window wiper oscillating mechanism includes a sector gear, one or more links and a pinion gear coupled to a window wiper shaft. In still another aspect of the present invention, a passive stop acts to deter movement of the window wiper oscillating mechanism and the wiper assembly when they are disposed in a park position.

The window wiper system of the present invention is advantageous over prior constructions in that the present invention serves to deter externally supplied forces, such as a car wash, bumpy road or the like, from moving and possibly damaging the wiper blade or wiper arm when it is in a park position. Hence, an internally mounted passive stop beneficially maintains the wiper assembly in its park position even if a worm gear is further rotated a predetermined amount in order to actuate optional door lock levers or gears other than those associated with the window wiper. The present invention is also advantageous over conventional devices in that the present invention has a minimal number of moving parts, and is relatively simple and inexpensive to manufacture. Moreover, the unidirectional nature of the electric motor and worm gear reduce traditional motor and gear noise while increasing part durability. Additional advantages and features of the present invention will become apparent from the following description and appended claims, taken in conjunction with the accompanying drawings.

DETAILED DESCRIPTION OF THE PREFERRED EMBODIMENT

Figure 1:
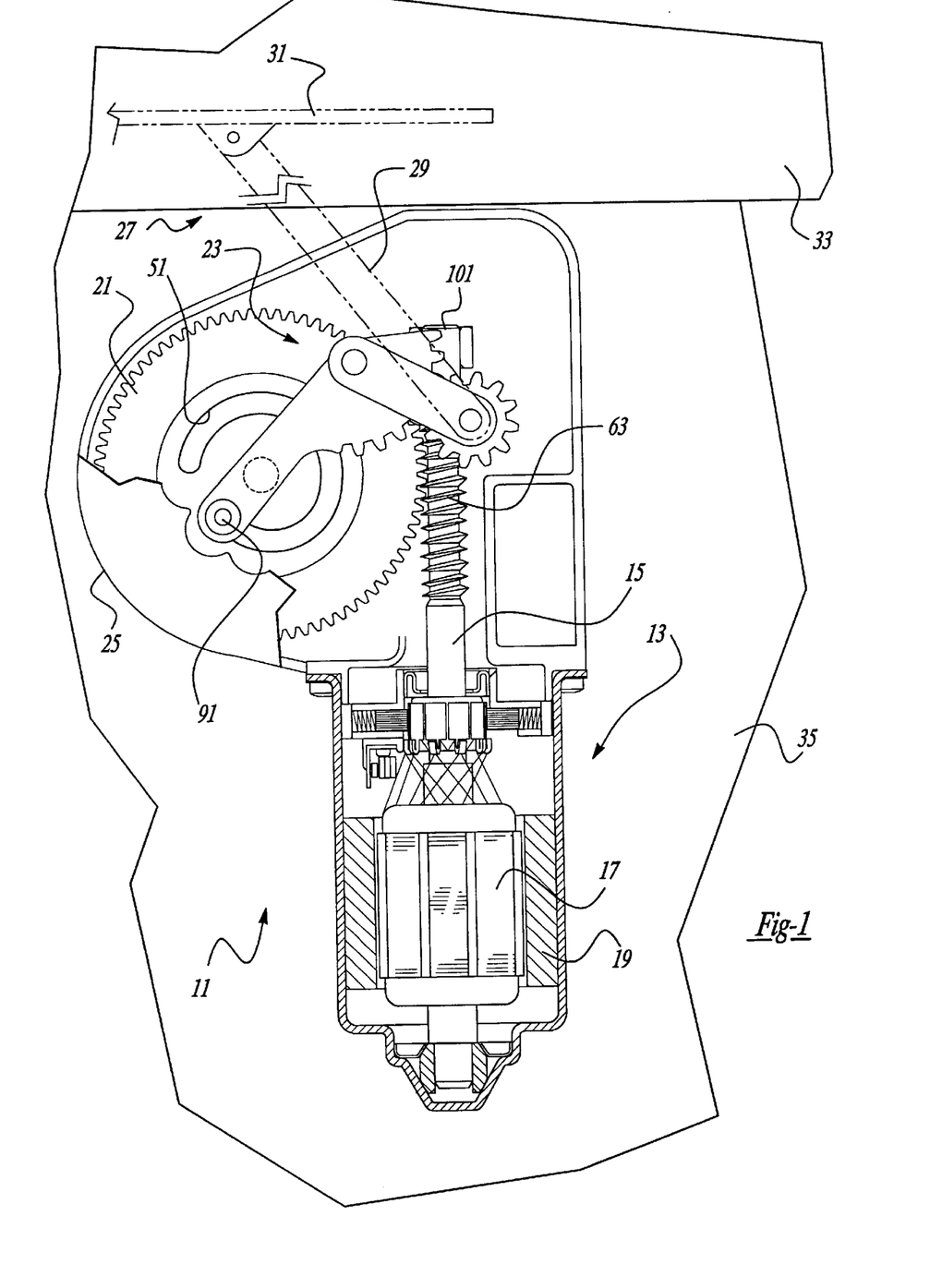
FIG. 1 is a rear elevational view, partially in section, showing the preferred embodiment of a window wiper system for an automotive vehicle of the present invention.

The preferred embodiment of a window wiper system 11 for use in an automotive vehicle is shown in FIG. 1. Window wiper system 11 includes a fractional horsepower, direct current, electric motor 13 having an armature shaft 15, an armature 17 and a fixed, permanent magnet stator 19. Window wiper system 11 further employs a main or worm gear 21, a window wiper oscillating mechanism, also known as a four-bar linkage mechanism 23, a gear casing 25 and a window wiper assembly 27. Window wiper assembly 27 includes an elongated wiper arm 29 and a wiper blade assembly 31, made up of a claw and a rubber blade, which are wiped in a back and forth, or oscillating manner along a rear liftgate window 33. When a liftgate window release latch is activated, liftgate window 33 is suitable for pivoting relative to a rear liftgate door 35 by way of upper hinges and pneumatic cylinders. Electric motor 13 and gear casing 25 are secured to rear liftgate door 35 as part of a multiplexed rear node arrangement, as is disclosed in U.S. Ser. No. 08/431,149 entitled "Control System For An Automotive Vehicle Multi-Functional Apparatus" which was filed on Apr. 28, 1995, and is incorporated by reference herein. Alternately, however, the window wiper system of the present invention can also be employed for stationary rear windows, front windshields or the like.

Figure 2:
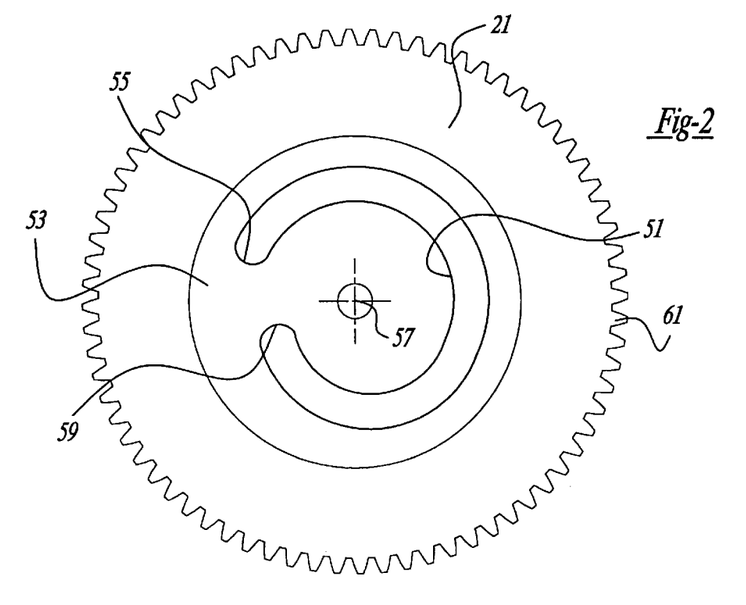
FIG. 2 is a rear elevational view showing a worm gear employed in the preferred embodiment window wiper system.

Referring to FIG. 2, the preferred embodiment of worm gear 21 has a spiral curved track 51 depressed below a nominal face 53. Track 51 has a first end 55 which is radially outboard of a central rotational axis 57 relative to a second and opposite end 59 of track 51. Ends 55 and 59 of track 51 are separated and discontinuous from each other by a raised nominal section of worm gear 21. A set of externally facing teeth 61 are disposed around a periphery of worm gear 21 and are suitably oriented for enmeshing with a worm gear segment 63 (see FIG. 1) of armature shaft 15 (also see FIG. 1). Worm gear 21 is preferably injection molded from a Delrin® polymeric material.

Figure 3:
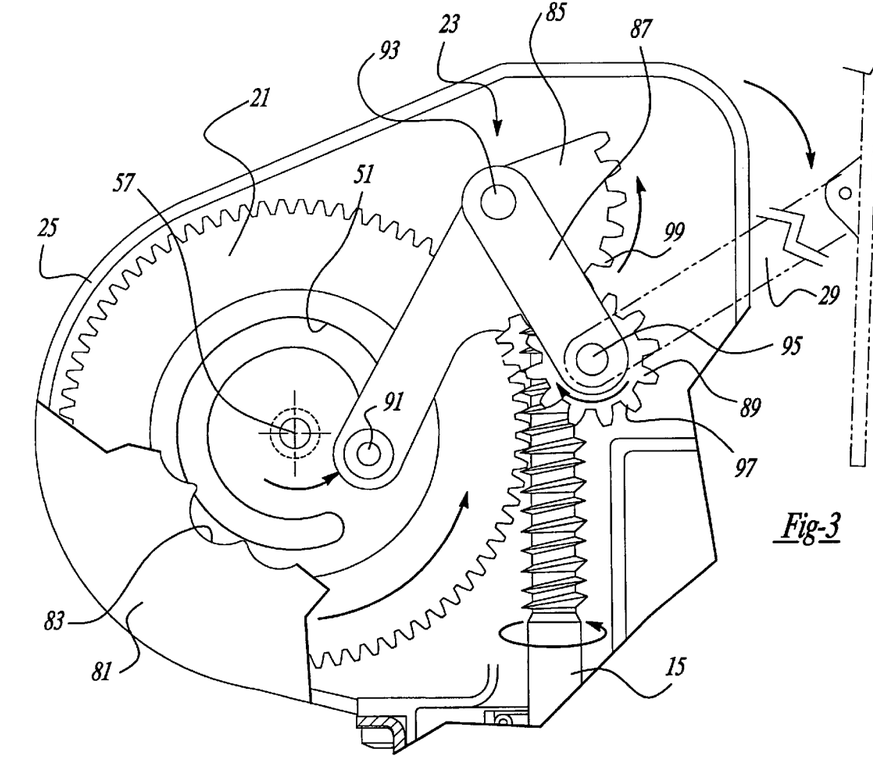
FIGS. 3–7 are fragmentary rear elevational views showing the preferred embodiment window wiper system disposed in various positions.
Figure 8:
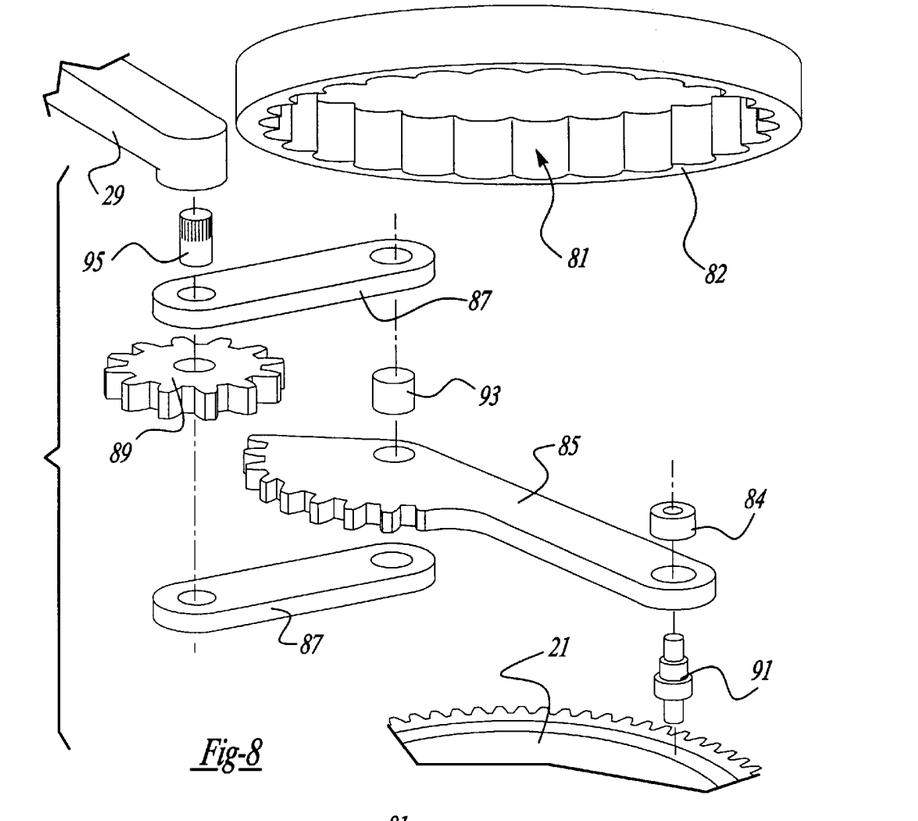
FIG. 8 is a partial fragmentary exploded perspective view showing a window wiper oscillating mechanism and a passive stop employed in the preferred embodiment window wiper system.
Figure 9:
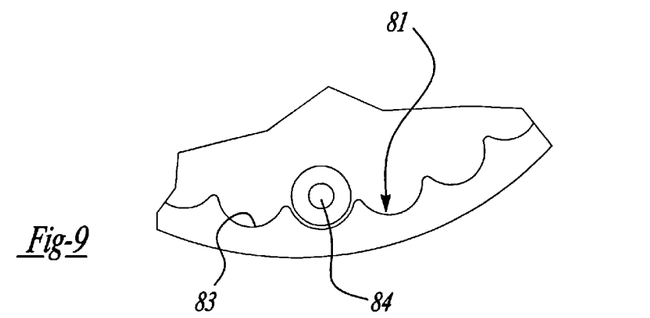
FIGS. 9 and 10 are diagrammatic views showing different positions of a coupling assembly relative to the passive stop employed in the preferred embodiment window wiper system.
Figure 10:
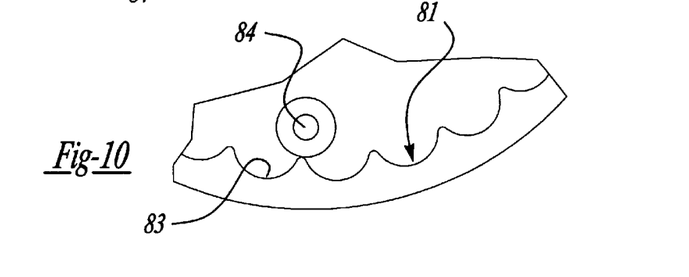

A set of passive stops 81 are illustrated in FIGS. 3 and 8 having multiple, curved detent depressions integrally injection molded from glass filled nylon or metal as part of an annular ring 82 or gear casing cover. Stops 81 inwardly project from an inside surface of ring 82 or may alternately be a single depression secured to gear casing 25. A semi-circular receptacle 83 of each stop 81 is inwardly facing toward rotational axis 57 of worm gear 21 for selectively receiving a polymeric bearing 84 moving with four-bar mechanism 23, as will be further discussed hereinafter. Thus, the wiper assembly can be parked and secured in a park position regardless of where the four-bar mechanism is located when the worm gear reverses direction. Moreover, bearing 84 will roll from a peak between stops 81 (FIG. 10) into a receptacle (FIG. 9) if misaligned.

Four-bar mechanism 23 includes a sector gear 85 (the first theoretical bar), a pair of straight links 87 (the second and third theoretical bars) and a pinion gear 89 (the fourth theoretical bar). A cylindrical pin coupling 91 depends from an elongated arm extending from sector gear 85. Pin 91 always is engaged with and rides in track 51. Bearing 84 is rotatably mounted on pin 91. Links 87 are pivotably pinned on either side of sector gear 85 by way of a coupling pin 93. The opposite ends of links 87 are coaxially coupled to a window wiper shaft 95 and sandwich pinion gear 89. Teeth 97 of pinion gear are enmeshed with teeth 99 of sector gear 85. Pinion gear 89 is longitudinally disposed generally between a distal end 101 (see FIG. 1) of armature shaft 15 and armature 17 (also see FIG. 1) in order to optimize packaging and geometry of the mechanism. Furthermore, sector gear 85 does not have a fixed pivot point but instead its rotational center is allowed to freely move or float relative to rotational axis 57 of worm gear 21 and the offset rotational axis of pinion gear 89. Window wiper arm 29 is movably coupled for coincidental movement with wiper shaft 95. Four-bar mechanism 23 is preferably made from steel.

Figure 4:
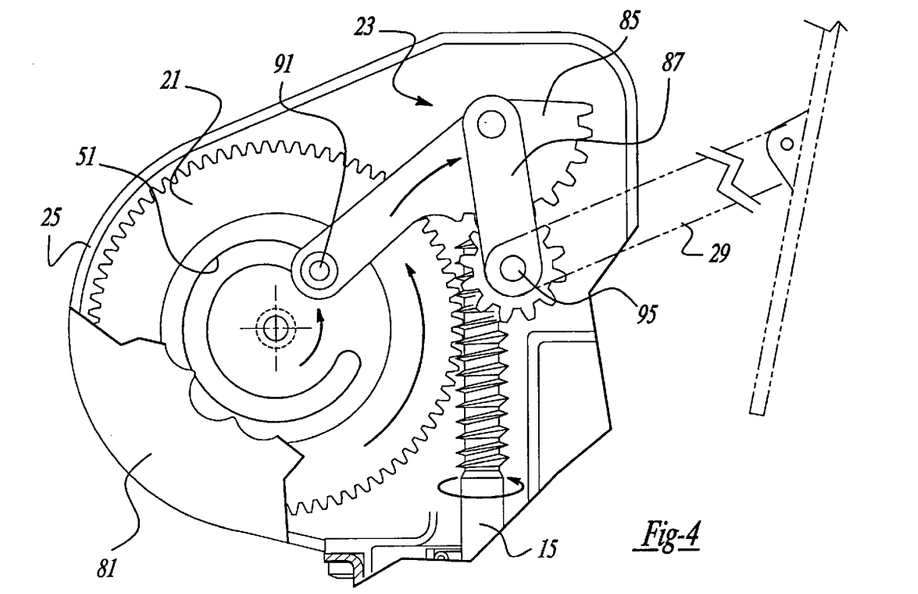
Figure 5:
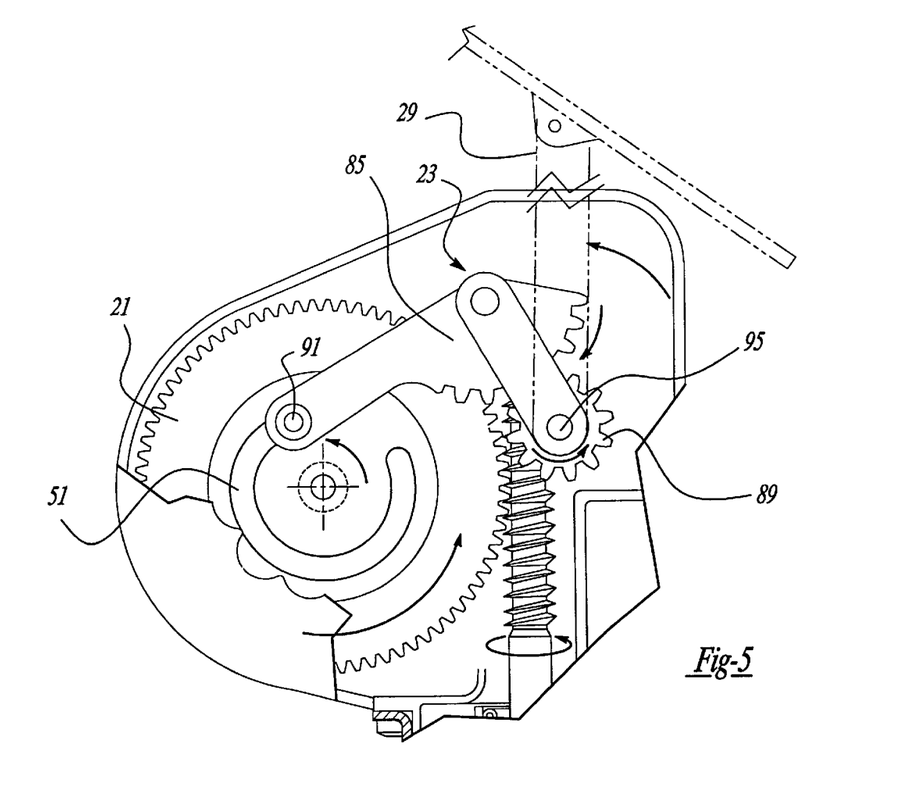
Figure 6:
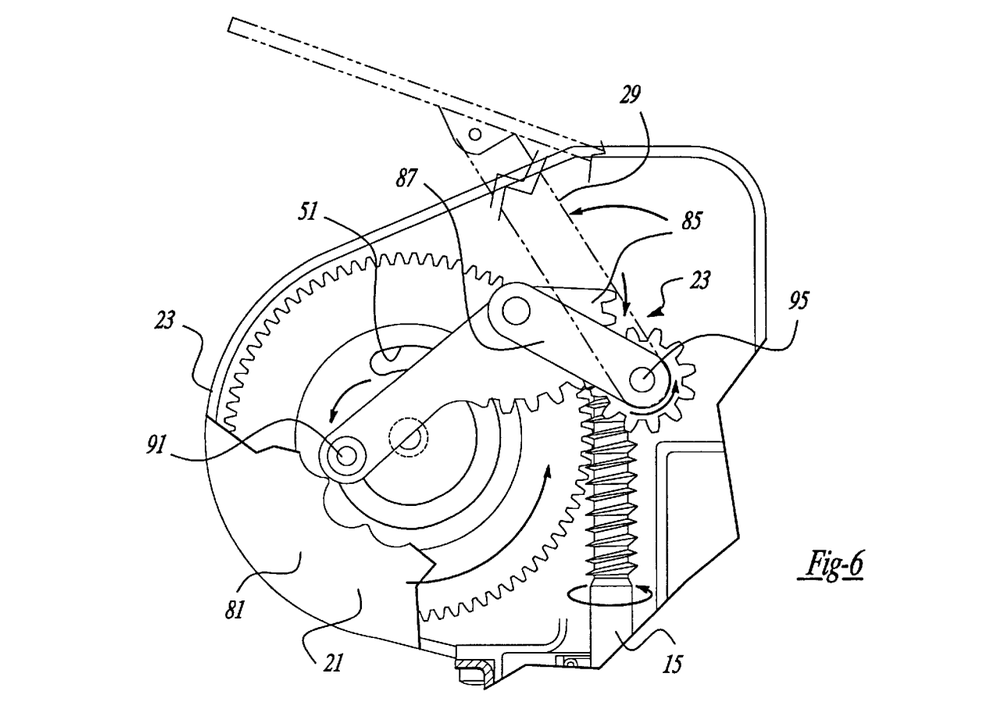

The operation of window wiper system 11 will now be discussed. The electric motor and worm gear 21 rotate in respective first unidirectional directions in order to drive four-bar mechanism 23 in forward and then reverse directions thereby oscillating window wiper shaft 95 and the attached window wiper arm 29. A comparison of FIGS. 4–6 show second end 59 (see FIG. 2) of track 51 abutting against and pulling pin 91 in the first rotational direction. This causes sector gear 85, pinion gear 89, window wiper shaft 95 and window wiper arm 29 to rotate in single advancing directions and causes a single advancing sweep of the wiper assembly across the window in the normal window wiping path or range. However, generally between the component positions illustrated in FIGS. 1, 3, and 6, further rotation of electric motor 13, worm gear 21 and pin 91 in the first unidirectional direction, causes sector gear 85, pinion gear 89, window wiper shaft 95 and window wiper arm 29 to reverse their direction and retract wiper assembly 27 back across window 33 to its initial window wiping range orientation.

Figure 7:
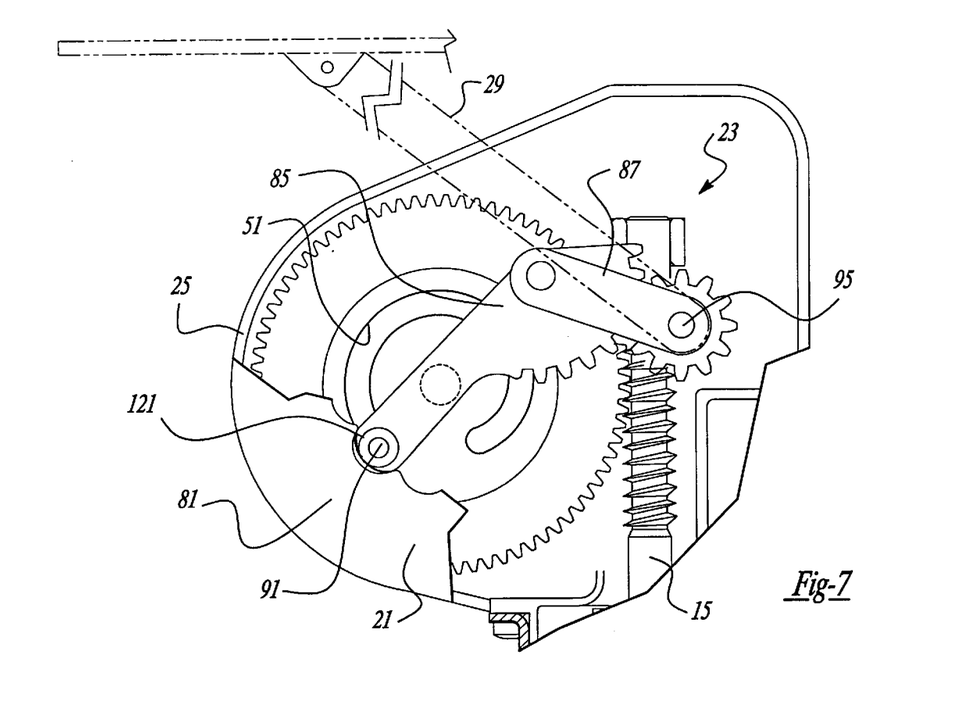

Subsequently, electric motor 13 is energized in a reverse manner thereby reversing the rotational direction of armature shaft 15 and worm gear 21. These reversal directions cause worm gear 21 to rotate independently of four-bar mechanism 23 and window wiper assembly 27 wherein pin 91 freely slides independently in track 51, in a lost motion manner, from the position shown in FIG. 1 to a park position shown in FIG. 7. Concurrent with this reverse rotation of worm gear 21, track 51 serves to outwardly cam pin 91 away from the rotational axis of worm gear 21 thereby engaging bearing 84 coupled to sector gear 85 in one of receptacles 83 of stop 81. This action locks and maintains four-bar mechanism 23 and window wiper assembly 27 in a park position off of the vehicle window 33 to thereby allow window 33 to pivot away from liftgate door 35.

While various aspects of the window wiper system have been disclosed, it should be appreciated that other variations may be employed without departing from the spirit of the present invention. For example, a raised rather than the disclosed depressed track may be mounted on the worm gear. Furthermore, another rotatable member beyond a worm gear can be employed with a track. Additionally, the function and stop of the preferred embodiment can be employed with a constantly reversing electric motor and without a four-bar-type linkage. Additionally, a variety of other gear reduction and linkage oscillating mechanisms are usable with the track and stop portions of the present invention. It is further envisioned that the passive stop may have alternate shapes and can be externally mounted on the gear or a motor casing. The coupling can also encompass many other shapes and formations depending on the desired track configuration. Various materials have been disclosed in an exemplary fashion, however, other materials may of course be employed. It is intended by the following claims to cover these and any other departures from the disclosed embodiments which fall within the true spirit of this invention.

The invention claimed is:

1. A window wiper system for an automotive vehicle, said system comprising:
   a gear having an elongated track, said track having a spiral curved shape, a first end of said track located radially outward of a rotational axis of said gear relative to a second end of said track;
   an electromagnetic device operably driving said gear;
   a window wiper oscillating mechanism;
   a window wiper assembly drivably coupled with said window wiper oscillating mechanism; and a coupling operably riding along said track and moving said window wiper oscillating mechanism in response to movement of said gear, said coupling always engaging said track regardless of the operable position of said gear.

2. The system of claim 1 further comprising:
said window wiper assembly being located in a park position beyond its normal oscillating window wiping path when said coupling is disposed at said first end of said track;
said wiper assembly being oscillated within its normal wiping path when said coupling is located at said second end of said track.

3. The system of claim 2 further comprising a passive stop mechanically retaining said window wiper oscillating mechanism and said wiper assembly in said park position when said gear is rotated in a second direction, a first rotational direction of said gear oscillating said wiper assembly repeatedly back and forth in its normal wiper path, said passive stop being disposed in a gear casing attached to said electromagnetic device.

4. The system of claim 1 wherein said window wiper oscillating mechanism includes a sector gear and at least one link, said coupling depending from a first section of said sector gear and said at least one link being movably coupled to a second section of said sector gear.

5. The system of claim 1 further comprising a window wiper shaft being driven by said window wiper oscillating mechanism, said window wiper shaft continually reversing rotational direction in response to unidirectional rotation of said rotatable member.

6. The system of claim 5 wherein said window wiper oscillating mechanism is a four-bar linkage arrangement employing a sector gear.

7. The system of claim 1 wherein said coupling is a pin which rides in said track, said track is depressed below a nominal face of said rotatable member, said rotatable member is a worm gear.

8. The system of claim 7 wherein said electromagnetic device is an electric motor including an armature shaft with a worm gear segment enmeshing with teeth of said worm gear, and a pinion gear of said window wiper oscillating mechanism being substantially longitudinally disposed between a distal end of said armature shaft and said armature.

9. The system of claim 1 wherein said track is depressed below a substantially flat face of said gear.

10. A window wiper system for an automotive vehicle, said system comprising:
a rotatable member having an elongated track;
an electromagnetic device operably driving said rotatable member;
a window wiper oscillating mechanism including a sector gear and at least one link;
a coupling operably riding along said track and moving said window wiper oscillating mechanism in response to movement of said rotatable member, said coupling always engaging said track regardless of the operable position of said rotatable member, said coupling depending from a first section of said sector gear and said at least one link being movably coupled to a second section of said sector gear;
an elongated window wiper arm having a proximal end;
a pinion gear having a fixed rotational axis;
a window wiper shaft coupling said window wiper arm to said pinion gear; and teeth of said sector gear enmeshing with teeth of said pinion gear;
wherein said at least one link has a first end journalled for movement about said rotational axis of said pinion gear;
whereby movement of said rotatable member serves to drive said sector gear and said at least one link thereby rotatably oscillating said pinion gear, said window wiper shaft and said window wiper arm in a continuous back and forth manner without requiring a reversal of said electromagnetic device.

11. A system for an automotive vehicle, said system comprising:
an electric motor;
a main gear rotating in a first direction in response to energization of said electric motor;
a spiral curved track disposed on said main gear, a first end of said track located radially outward of a rotational axis of said main gear relative to a second end of said track, said ends of said track being separated and discontinuous from each other;
an actuated device movable within a normal path of travel; and
a coupling connected with said actuated device and riding along said track for controlling movement of said actuated device;
said actuated device being movable within its normal path of travel when said coupling is located at said second end of said track by rotation of said gear;
said actuated device being movable to a displaced position out of said normal pattern when said coupling is located at said first end of said track.

12. The system of claim 11 wherein said actuated device is a wiper.

13. The system of claim 11 further comprising:
a pinion gear having a fixed rotational axis;
teeth of a sector gear enmeshing with teeth of said pinion gear; and
a link having a first end journalled for movement about said rotational axis of said pinion gear, movement of said main gear operably serving to drive said sector gear and said link thereby rotatably oscillating said pinion gear and said actuated device in a continuous back and forth manner without requiring a reversal of said electric motor.

14. A window wiper system for an automotive vehicle, said system comprising:
an electromagnetic device;
a gear casing;
a rotatable member located in said gear casing and being operably rotated in response to energization of said electromagnetic device;
a window wiper shaft;
a linkage mechanism coupling said window wiper shaft to said rotatable member whereby rotation of said rotatable member serves to rotate said window wiper shaft; and
at least one of multiple stops abutting against a section of said linkage mechanism when said window wiper shaft is disposed in a park position offset from a normal window wiper range, whereby said at least one stop deters movement of said window wiper shaft due to externally applied forces when it is desired to maintain said window wiper shaft in said park position.

15. The system of claim 14 wherein said rotatable member includes a track having a spiral curved shape coupled to said linkage mechanism.

16. The system of claim 14 wherein said multiple stops are located adjacent to each other to maintain said section of said linkage mechanism in said park position regardless of the location of said linkage mechanism when said rotatable member reverses direction from its normal wiping direction, said stops are rigid.

17. The system of claim 14 further comprising a curved receptacle of said at least one stop operably receiving a portion of said linkage mechanism when said linkage mechanism is moved to said park position.

18. The system of claim 14 further comprising:

a window wiper assembly coupled to said window wiper shaft, said window wiper assembly having a normal back and forth wiping range and having a park position located outside of said normal window wiping range;

wherein said electromagnetic device is an electric motor and said rotatable member is a worm gear, said electric motor and said worm gear respectively rotate in first directions to oscillate said window wiper shaft and said window wiper assembly back and forth along said normal window wiping range, said electric motor and said worm gear respectively rotate in second opposite directions from said first directions to move said window wiper shaft and said window wiper assembly to said park position.

19. The system of claim 18 wherein said window wiper assembly is maintained in said park position even when said worm gear is rotated a predetermined amount thereafter.

* * * * *